United States Patent
Fox et al.

(10) Patent No.: US 9,195,853 B2
(45) Date of Patent: Nov. 24, 2015

(54) AUTOMATED DOCUMENT REDACTION

(75) Inventors: Joshua Fox, Emek Haela (IL); Josemina Marcella Magdalen, Jerusalem (IL); Michael Pelts, Tzur Hadasa (IL)

(73) Assignee: International Business Machines Corporation, Armonk, NY (US)

(*) Notice: Subject to any disclaimer, the term of this patent is extended or adjusted under 35 U.S.C. 154(b) by 449 days.

(21) Appl. No.: 13/350,794

(22) Filed: Jan. 15, 2012

(65) Prior Publication Data
US 2013/0185634 A1 Jul. 18, 2013

(51) Int. Cl.
*G06F 17/21* (2006.01)
*G06F 21/62* (2013.01)

(52) U.S. Cl.
CPC .................. *G06F 21/6254* (2013.01)

(58) Field of Classification Search
CPC ...................................................... G06F 17/211
USPC ......................................................... 715/256
See application file for complete search history.

(56) References Cited

U.S. PATENT DOCUMENTS

| | | | |
|---|---|---|---|
| 5,619,648 A | 4/1997 | Canale | |
| 5,664,109 A | 9/1997 | Johnson | |
| 5,940,843 A | 8/1999 | Zucknovich | |
| 6,052,682 A | 4/2000 | Miller | |
| 6,161,084 A | 12/2000 | Messerly | |
| 6,178,439 B1 | 1/2001 | Feit | |
| 6,226,635 B1 | 5/2001 | Katariya | |
| 6,330,610 B1 | 12/2001 | Docter | |
| 6,336,117 B1 | 1/2002 | Massarani | |
| 6,453,327 B1 | 9/2002 | Nielsen | |
| 6,539,371 B1 | 3/2003 | Bleizeffer et al. | |

(Continued)

FOREIGN PATENT DOCUMENTS

| EP | 1077421 A2 | 2/2001 |
|---|---|---|
| EP | 1638032 A2 | 3/2006 |

(Continued)

OTHER PUBLICATIONS

Cumby, Chad M., and Rayid Ghani. "A Machine Learning Based System for Semi-Automatically Redacting Documents." in IAAI. 2011.*

(Continued)

*Primary Examiner* — Frank D Mills
(74) *Attorney, Agent, or Firm* — David W. Victor; Konrad, Raynes, Davda and Victor LLP

(57) ABSTRACT

Document redaction includes identifying within a computer-based document stored on computer-readable storage medium, a candidate redaction element that is of a predefined redaction element type, identifying an evaluation element that is of a predefined evaluation element type and that is associated with the candidate redaction element, identifying a predefined logic expression that is associated with the redaction element type and that operates on the evaluation element type, evaluating the logic expression which generates a value, identifying a predefined permission expression that is associated with the logic expression, that operates on the value, and that is associated with a recipient role, evaluating the permission expression, which identifies a redaction directive, and applying the redaction directive to the candidate redaction element within the computer-based document prior to the computer-based document being provided to a recipient having the recipient role.

21 Claims, 4 Drawing Sheets

(56) References Cited

U.S. PATENT DOCUMENTS

| | | | |
|---|---|---|---|
| 6,640,010 B2 | 10/2003 | Seeger et al. | |
| 6,820,082 B1 | 11/2004 | Cook et al. | |
| 6,820,237 B1 | 11/2004 | Abu-Hakima et al. | |
| 6,879,977 B2 | 4/2005 | Huffman et al. | |
| 6,928,618 B2 | 8/2005 | Kohls et al. | |
| 6,931,403 B1 | 8/2005 | Agrawal et al. | |
| 6,952,720 B2 | 10/2005 | Guedalia et al. | |
| 7,028,049 B1 | 4/2006 | Shelton | |
| 7,181,495 B2 | 2/2007 | Skladman et al. | |
| 7,194,693 B2 | 3/2007 | Cragun et al. | |
| 7,206,814 B2 | 4/2007 | Kirsch | |
| 7,243,097 B1 | 7/2007 | Agrawal | |
| 7,293,017 B2 | 11/2007 | Hurst-Hiller et al. | |
| 7,316,032 B2 | 1/2008 | Tayebi | |
| 7,412,605 B2 | 8/2008 | Raley | |
| 7,523,135 B2 | 4/2009 | Bradford et al. | |
| 7,730,010 B2 | 6/2010 | Kishore et al. | |
| 7,748,027 B2 | 6/2010 | Patrick | |
| 7,752,566 B1 | 7/2010 | Nelson | |
| 7,802,305 B1* | 9/2010 | Leeds | 726/26 |
| 7,805,673 B2 | 9/2010 | der Quaeler | |
| 7,873,838 B2 | 1/2011 | Staddon et al. | |
| 2002/0165201 A1 | 11/2002 | Binderup et al. | |
| 2004/0054918 A1 | 3/2004 | Duri | |
| 2004/0061716 A1 | 4/2004 | Cheung et al. | |
| 2004/0073461 A1 | 4/2004 | Pappas | |
| 2004/0139043 A1 | 7/2004 | Lei et al. | |
| 2004/0240735 A1 | 12/2004 | Medina | |
| 2005/0140572 A1 | 6/2005 | Kahan | |
| 2005/0283471 A1 | 12/2005 | Ahmed | |
| 2006/0026159 A1 | 2/2006 | Dettinger | |
| 2006/0031301 A1 | 2/2006 | Herz | |
| 2006/0053097 A1 | 3/2006 | King | |
| 2006/0136985 A1 | 6/2006 | Ashley | |
| 2006/0156222 A1 | 7/2006 | Chi et al. | |
| 2006/0259954 A1* | 11/2006 | Patrick | 726/2 |
| 2006/0259977 A1 | 11/2006 | Patrick | |
| 2007/0030528 A1* | 2/2007 | Quaeler et al. | 358/453 |
| 2007/0094284 A1 | 4/2007 | Bradford et al. | |
| 2007/0094594 A1* | 4/2007 | Matichuk et al. | 715/530 |
| 2007/0118534 A1 | 5/2007 | Hayes et al. | |
| 2007/0192734 A1 | 8/2007 | Berstis et al. | |
| 2007/0203776 A1 | 8/2007 | Austin | |
| 2007/0239653 A1 | 10/2007 | Kiehn | |
| 2007/0255704 A1 | 11/2007 | Baek | |
| 2007/0271212 A1 | 11/2007 | Jones | |
| 2007/0274478 A1 | 11/2007 | Crawford, III | |
| 2007/0276649 A1 | 11/2007 | Schubert | |
| 2008/0016341 A1* | 1/2008 | Staddon et al. | 713/165 |
| 2008/0016372 A1* | 1/2008 | Staddon et al. | 713/189 |
| 2008/0046757 A1* | 2/2008 | Staddon et al. | 713/189 |
| 2008/0052759 A1 | 2/2008 | Kronlund et al. | |
| 2008/0072290 A1 | 3/2008 | Metzer | |
| 2008/0204788 A1 | 8/2008 | Kelly et al. | |
| 2008/0250021 A1 | 10/2008 | Boys | |
| 2008/0320604 A1 | 12/2008 | Nakajima et al. | |
| 2009/0037222 A1 | 2/2009 | Kuo | |
| 2009/0089663 A1* | 4/2009 | Rebstock et al. | 715/253 |
| 2009/0094675 A1 | 4/2009 | Powers et al. | |
| 2009/0132419 A1 | 5/2009 | Grammer et al. | |
| 2009/0164878 A1* | 6/2009 | Cottrille | 715/210 |
| 2009/0164881 A1* | 6/2009 | Segarra et al. | 715/230 |
| 2009/0192941 A1 | 7/2009 | Fournier | |
| 2009/0265316 A1 | 10/2009 | Poulin et al. | |
| 2009/0276701 A1 | 11/2009 | Nurmi | |
| 2009/0296166 A1* | 12/2009 | Schrichte | 358/474 |
| 2009/0299853 A1 | 12/2009 | Jones | |
| 2009/0323087 A1 | 12/2009 | Luo | |
| 2010/0010912 A1 | 1/2010 | Jones | |
| 2010/0046015 A1 | 2/2010 | Whittle | |
| 2010/0070396 A1* | 3/2010 | Schrichte | 705/34 |
| 2010/0082652 A1 | 4/2010 | Jones | |
| 2010/0229246 A1* | 9/2010 | Warrington et al. | 726/28 |
| 2010/0241844 A1* | 9/2010 | Hussain et al. | 713/150 |
| 2011/0055932 A1 | 3/2011 | Fox et al. | |
| 2011/0066606 A1 | 3/2011 | Fox et al. | |
| 2011/0119361 A1* | 5/2011 | Issa et al. | 709/223 |
| 2011/0119576 A1* | 5/2011 | Aumann | 715/255 |
| 2011/0162084 A1* | 6/2011 | Fox et al. | 726/28 |
| 2011/0179352 A1* | 7/2011 | Treadwell et al. | 715/255 |
| 2011/0239113 A1* | 9/2011 | Hung et al. | 715/271 |
| 2011/0247081 A1* | 10/2011 | Shelton | 726/28 |
| 2012/0159296 A1* | 6/2012 | Rebstock et al. | 715/205 |
| 2012/0192066 A1 | 7/2012 | Fox et al. | |
| 2012/0239380 A1* | 9/2012 | Cumby et al. | 704/9 |
| 2012/0304304 A1* | 11/2012 | Avrahami et al. | 726/27 |
| 2013/0117802 A1* | 5/2013 | Fendt | 726/1 |
| 2013/0144901 A1* | 6/2013 | Ho et al. | 707/769 |
| 2013/0151346 A1* | 6/2013 | Schoen | 705/14.66 |
| 2014/0136941 A1 | 5/2014 | Avrahami et al. | |

FOREIGN PATENT DOCUMENTS

| | | |
|---|---|---|
| EP | 1818807 | 8/2007 |
| EP | 2375353 | 10/2011 |
| EP | 2375353 A1 | 10/2011 |
| JP | 2004252773 | 9/2004 |
| WO | 2006/026159 A1 | 3/2006 |
| WO | 2006041318 A1 | 4/2006 |
| WO | WO2006041318 A1 | 4/2006 |
| WO | 2006104810 A3 | 10/2006 |
| WO | WO2006104810 A2 | 10/2006 |
| WO | WO2006104810 A3 | 10/2006 |
| WO | WO2007044970 A2 | 4/2007 |
| WO | WO2008005017 A1 | 1/2008 |
| WO | 2008122825 A1 | 10/2008 |
| WO | WO2008122825 A1 | 10/2008 |

OTHER PUBLICATIONS

U.S. Appl. No. 12/648,413_Feb. 1, 2013_ResponseNonfinalRejection.

PCT/IB2013/050355_May 3, 2013_InternationalSearchReportAndWrittenOpinion.

U.S. Appl. No. 12/548,123_Jul. 5, 2013_FinalRejection.

U.S. Appl. No. 12/648,413_Aug. 8, 2013_FinalRejection.

Stolfo, et al., "PARULEL: Parallel Rule Processing Using Meta-rules for Redaction," Department of Computer Science, Columbia University, New York, NY 10027, Jun. 25, 1991, pp. 1-47.

Damiani, Ernesto et al., "A Fine-Grained Access Control System for XML Documents," SCM Transactions on Information and System Security, vol. 5, No. 2, May 2002, pp. 169-202.

IBM, "Privacy for Instant-Message or Email Popups", IP.Com, Mar. 16, 2009, https://priorart.ip.com/download/IPCOM000180738D/IPCOM000180738D.pdf.

"Google Hacking," Wikipedia, the Free Encyclopedia, (retrieved Jun. 16, 2010), http://en.wikipedia.org/wiki/Google_hacking.

Rogers, G., "Googling Google: Google Gives Malware the Finger," ZDNet, CBS Interactive, Inc., Aug. 4, 2006, (retrieved Jun. 16, 2010), http://www.zdnet.com/blog/google/google-gives-malware-the-finger/283.

"Turn Desktop Alerts on or off," Microsoft Office Support, Outlook 2007, downloaded Apr. 26, 2012, http://office.microsoft.com/en-us/outlook-help/turn-desktop-alerts-on-or-off-HA010098670.aspx.

Kazem Taghva, et al., Information Science Research Institute University of Nevada, Las Vegas, "Identification and Redaction of Privacy Information in Scanned Documents," The 5th International Conference on Information Technology and Applications (ICITA 2008).

Wong, Alexander, et al., Department of Electrical and Computer Engineering University of Waterloo Waterloo, Ontario, Canada, "Expert Knowledge Based Automatic Regions-of-Interest (ROI) Selection in Scanned Documents for Digital Image Encryption," Proceedings of the 3rd Canadian Conference on Computer and Robot Vision (CRV'06).

U.S. Appl. No. 12/559,720_Mar. 1, 2012_NonfinalRejection.

U.S. Appl. No. 12/559,720_Jun. 1, 2012_ResponseToNonfinalRejection.

U.S. Appl. No. 12/548,123_May 8, 2012_NonfinalRejection.

U.S. Appl. No. 12/559,720_Aug. 27, 2012_FinalRejection.

(56) References Cited

OTHER PUBLICATIONS

U.S. Appl. No. 12/648,413_Sep. 27, 2012_NonfinalRejection.
Bier, Eric, et al., "The Rules of redaction: identify, protect, review (and repeat)," Palo Alto Research Center, 2009 IEEE.
Porat, Sara et al., "Masking gateway for enterprises," IBM Haifa Research Lab, Spinger-Verlag Berlin Heidelberg 2009.
IBM, "InfoSphere Guardium Data Redaction", Solution Brief, IBM Software, Jul. 2012.
Redact-It Overview, http://www.redact.com/overview, downloaded Feb. 10, 2012.
U.S. Department of Energy Office of Science, The Office of Science Graduate Fellowship Program, "Resources for Handling Transcripts," downloaded Sep. 30, 2012, http://scgf.orau.gov/transcripts-resources.html.
ZyLAB, "Use Intelligent Redaction Tools to Secure Your Data", downloaded on Sep. 24, 2012.
U.S. Appl. No. 12/548,123_IL920090018US1_Oct. 8, 2012_ResponseNonfinalRejection.
U.S. Appl. No. 12/548,123_IL920090018US1_Oct. 30, 2012_SupplementalResponse.
U.S. Appl. No. 12/559,720_IL920090033US1_Dec. 27, 2012_ResponseToFinalRejection(RCE.
Preliminary Remarks, dated Oct. 2, 2009, for U.S. Appl. No. 12/548,123, filed Aug. 26, 2009, entitled "Method for Detecting End Point of Plasma Etching and Plasma Etching Apparatus", invented by Joshua Fox et al., Total 3 pgs.
Office Action, dated May 8, 2012, for U.S. Appl. No. 12/548,123, filed Aug. 26, 2009, entitled "Method for Detecting End Point of Plasma Etching and Plasma Etching Apparatus", invented by Joshua Fox et al., Total 19 pgs.
Response to Office Action, dated Oct. 8, 2012, for U.S. Appl. No. 12/548,123, filed Aug. 26, 2009, entitled "Method for Detecting End Point of Plasma Etching and Plasma Etching Apparatus", invented by Joshua Fox et al., Total 14 pgs.
Supplemental Amendment, dated Oct. 30, 2012, for U.S. Appl. No. 12/548,123, filed Aug. 26, 2009, entitled "Method for Detecting End Point of Plasma Etching and Plasma Etching Apparatus", invented by Joshua Fox et al., Total 6 pgs.
Final Office Action, dated Jul. 5, 2013, for U.S. Appl. No. 12/548,123, filed Aug. 26, 2009, entitled "Method for Detecting End Point of Plasma Etching and Plasma Etching Apparatus", invented by Joshua Fox et al., Total 14 pgs.
Response to Final Office Action, dated Nov. 5, 2013, for U.S. Appl. No. 12/548,123, filed Aug. 26, 2009, entitled "Method for Detecting End Point of Plasma Etching and Plasma Etching Apparatus", invented by Joshua Fox et al., Total 11 pages.
OA3 for dated Dec. 20, 2013, for U.S. Appl. No. 12/548,123, filed Aug. 26, 2009, entitled "Method for Detecting End Point of Plasma Etching and Plasma Etching Apparatus", invented by Joshua Fox et al., Total 13 pages.
Response to Office Action, dated Apr. 4, 2014, for U.S. Appl. No. 12/548,123, filed Aug. 26, 2009, entitled "Method for Detecting End Point of Plasma Etching and Plasma Etching Apparatus", invented by Joshua Fox et al., Total 4 pages.
Office Action, dated Mar. 1, 2012, for U.S. Appl. No. 12/559,720, filed Sep. 15, 2009, entitled, "Search Engine With Privacy Protection", invented by Joshua Fox et al., Total 32 pages.
Response to Office Action, dated May 9, 2012, for U.S. Appl. No. 12/559,720, filed Sep. 15, 2009, entitled, "Search Engine With Privacy Protection", invented by Joshua Fox et al., Total 8 pgs.
Supplemental Amendment, dated Jun. 1, 2012, for U.S. Appl. No. 12/559,720, filed Sep. 15, 2009, entitled, "Search Engine With Privacy Protection", invented by Joshua Fox et al., Total 19 pgs.
Final Office Action, dated Aug. 27, 2012, for U.S. Appl. No. 12/559,720, filed Sep. 15, 2009, entitled, "Search Engine With Privacy Protection", invented by Joshua Fox et al., Total 34 pages.
Response to Final Office Action, dated Dec. 27, 2012, for U.S. Appl. No. 12/559,720, filed Sep. 15, 2009, entitled, "Search Engine With Privacy Protection", invented by Joshua Fox et al., Total 21 pgs.

Notice of Allowance, dated Jun. 20, 2014, for U.S. Appl. No. 12/559,720, filed Sep. 15, 2009, entitled, "Search Engine With Privacy Protection", invented by Joshua Fox et al., Total 15 pages.
Preliminary Amendment, dated Mar. 27, 2012, for U.S. Appl. No. 12/648,413, filed Dec. 29, 2009,entitled, "Selecting Portions of Computer-Accessible Documents for Post-Selection Processing", invented by Joshua Fox et al., Total 6 pages.
Office Action, dated Sep. 27, 2012, for U.S. Appl. No. 12/648,413, filed Dec. 29, 2009, entitled, "Selecting Portions of Computer-Accessible Documents for Post-Selection Processing", invented by Joshua Fox et al., Total 19 pages.
Response to Office Action, dated Feb. 1, 2013, for U.S. Appl. No. 12/648,413, filed Dec. 29, 2009, entitled, "Selecting Portions of Computer-Accessible Documents for Post-Selection Processing", invented by Joshua Fox et al., Total 12 pages.
Final Office Action, dated Aug. 8, 2013, for U.S. Appl. No. 12/648,413, filed Dec. 29, 2009, entitled, "Selecting Portions of Computer-Accessible Documents for Post-Selection Processing", invented by Joshua Fox et al., Total 34 pages.
Response to Final Office Action, dated Nov. 8, 2013, for U.S. Appl. No. 12/648,413, filed Dec. 29, 2009, entitled, "Selecting Portions of Computer-Accessible Documents for Post-Selection Processing", invented by Joshua Fox et al., Total 15 pages
Office Action, dated Dec. 5, 2013, for U.S. Appl. No. 12/648,413, filed Dec. 29, 2009, entitled, "Selecting Portions of Computer-Accessible Documents for Post-Selection Processing", invented by Joshua Fox et al., Total 37 pages.
Response to Office Action, dated Apr. 4, 2014, for U.S. Appl. No. 12/648,413, filed Dec. 29, 2009, entitled, "Selecting Portions of Computer-Accessible Documents for Post-Selection Processing", invented by Joshua Fox et al., Total 14 pages.
Preliminary Amendment, dated Mar. 27, 2012, for U.S. Appl. No. 13/431,032, filed Mar. 27, 2012, entitled, "Selecting Portions of Computer-Accessible Documents for Post-Selection Processing", invented by Joshua Fox et al., Total 6 pages.
Office Action, dated Mar. 7, 2014, for U.S. Appl. No. 13/431,032, filed Mar. 27, 2012, entitled, "Selecting Portions of Computer-Accessible Documents for Post-Selection Processing", invented by Joshua Fox et al., Total 36 pages.
International Search Report and Written Opinion, dated May 3, 2013, for International Application No. PCT/IB2013/050355, filed Jan. 15, 2013,Total 9 pages.
Deguillaume, F. et al., "Protocols for Data-Hiding Based Text Document Security and Automatic Processing", Downloaded on Sep. 22, 2009 from IEEE Xplore, Computer Science Department, CUI-University of Geneva, Total 12 pages.
IBM Corporation, "InfoSphere Guardium Data Redaction", dated Jul. 2012, Solution Brief, IBM Software, Total 6 pages.
Taghva, K., et al., "Identification and Redaction of Privacy Information in Scanned Documents", dated 2008, Information Science Research, Institute University of Nevada, Las Vegas, The 5th International Conference on Information Technology Applications, Total 8 pages.
"Redact-It Overview", (online), downloaded on Feb. 10, 2012 from URL>http://www.redact.com/overview, Total 3 pages.
"Turn Desktop Alerts On or Off" (online) Microsoft Office Support, Outlook 2007, downloaded Apr. 26, 2012 at URL>http:office.microsoft.com/en-us/outlook-help/turn-desktop-alerts-on-or-offHA010098670.aspx, Total 4 pages.
US Department of Energy Office of Science, The Office of Science Graduate Fellowship Program, "Resourses of Handling Transcripts", downloaded Sep. 30, 2012, http://scgf.orau.gov/transcripts-resources.html, Total 3 pages.
Wong, A. et al , "Expert Knowledge Based Automatic Regions-of-Interst (ROU) Selection in Scanned Documents for Digital Image Encryption",Department of Electrical and Computer Engineering University of Waterloo, Ontario, Canada, Total 8 pages.
ZyLAB, "Use Intelligent Redaction Tools to Secure Your Data", retrieved from the Internet on Sep. 24, 2012 at URL>http:www.zylab.com/Solutions/Redact/Secure.aspx, Total 2 pages.
Damiani et al. A Fine-Grained Access Control System for XML Documents, dated May 2002, ACM transactions on Information and System Security, vol. 6, pp. 169-202, document No. XP0026245587.

(56) References Cited

OTHER PUBLICATIONS

U.S. Appl. No. 14/228,246, filed Mar. 26, 2014, entitled "Focused Personal Identifying Information Redaction", invented by Joshua Fox et al, Total 27 pages.

Wong, A. et al , "Expert Knowledge Based Automatic Regions-of-Interst (ROU) Selection in Scanned Documents for Digital Image Encryption", dated 2006, Department of Electrical and Computer Engineering University of Waterloo, Ontario, Canada, Total 8 pages.

"Document Technology Systems Redaction Overview", Document Technology Systems, dated Apr. 28, 2006, (online) retrieved from the Internet at URL>http:www.dts-doc.com, Total 2 pages.

"Intellidact Intelligent Redaction Software", dated 2008, Computing Systems Innovations Inc., Total 2 pages.

Notice of Allowance, dated Jan. 30 15, for U.S. Appl. No. 12/559,720, filed Sep. 15, 2009, invented by Joshua Fox, total 10 pages.

Final Office Action, dated Feb. 5, 2015, for U.S. Appl. No. 14/499,563, filed Sep. 15, 2014, invented by Joshua Fox, total 20 pages.

Office Action, dated Mar. 26, 2015, for U.S. Appl. No. 12/548,123, filed Aug. 26, 2009, invented by Joshua Fox, Total 15 pages.

Response to Office Action, dated Jun. 22, 2015, for U.S. Appl. No. 12/548,123, filed Aug. 26, 2009, invented by Joshua Fox, Total 7 pages.

Response to Office Action, dated Apr. 28, 2015, for U.S. Appl. No. 13/676,712, filed Nov. 14, 2012, invented by Joshua Fox, Total 9 pages.

Final Office Action, dated Jun. 10, 2015, for U.S. Appl. No. 13/676,712, filed on Nov. 14, 2012 by S. Avrahami et al., Total 25 pages.

Notice of Allowance, dated Jun. 19, 2015, for U.S. Appl. No. 12/559,720, filed on Sep. 15, 2009, invented by Joshua Fox, Total 13 pages.

Office Action, dated Apr. 10, 2015, for U.S. Appl. No. 12/648,413, filed Dec. 29, 2009, invented by Joshua Fox, Total 45 pages.

Response to Final Office Action, dated Apr. 28, 2015, for U.S. Appl. No. 13/431,032, filed Mar. 27, 2012, invented by Joshua Fox, Total 9 pages.

Response to Office Action, dated Jul. 10, 2015, for U.S. Appl. No. 12/648,413, filed Dec. 29, 2009, invented by Joshua Fox , Total 14 pages.

Office Action, dated Jul. 22, 2015, for U.S. Appl. No. 13/431,032, filed Mar. 27, 2012, invented by Joshua Fox, Total 30 pages.

US Patent Application, dated Sep. 1, 2015, for U.S. Appl. No. 14/842,731, filed Sep. 1, 2015, invented by Joshua Fox, Total 38 pages.

Final Office Action, dated Sep. 2, 2015, for U.S. Appl. No. 12/548,123, filed Aug. 26, 2009, invented by Joshua Fox, Total 14 pages.

* cited by examiner

```
Expression E

Input DateOfBirth d, PersonName p if (Now - DateOfBirth < 18) then return p else return false
```

Fig. 3A

Recipient Role: *Visiting Nurse*

Expression to be evaluated: *E*

Redact for this role if expression is satisfied: *Yes*

Fig. 3B

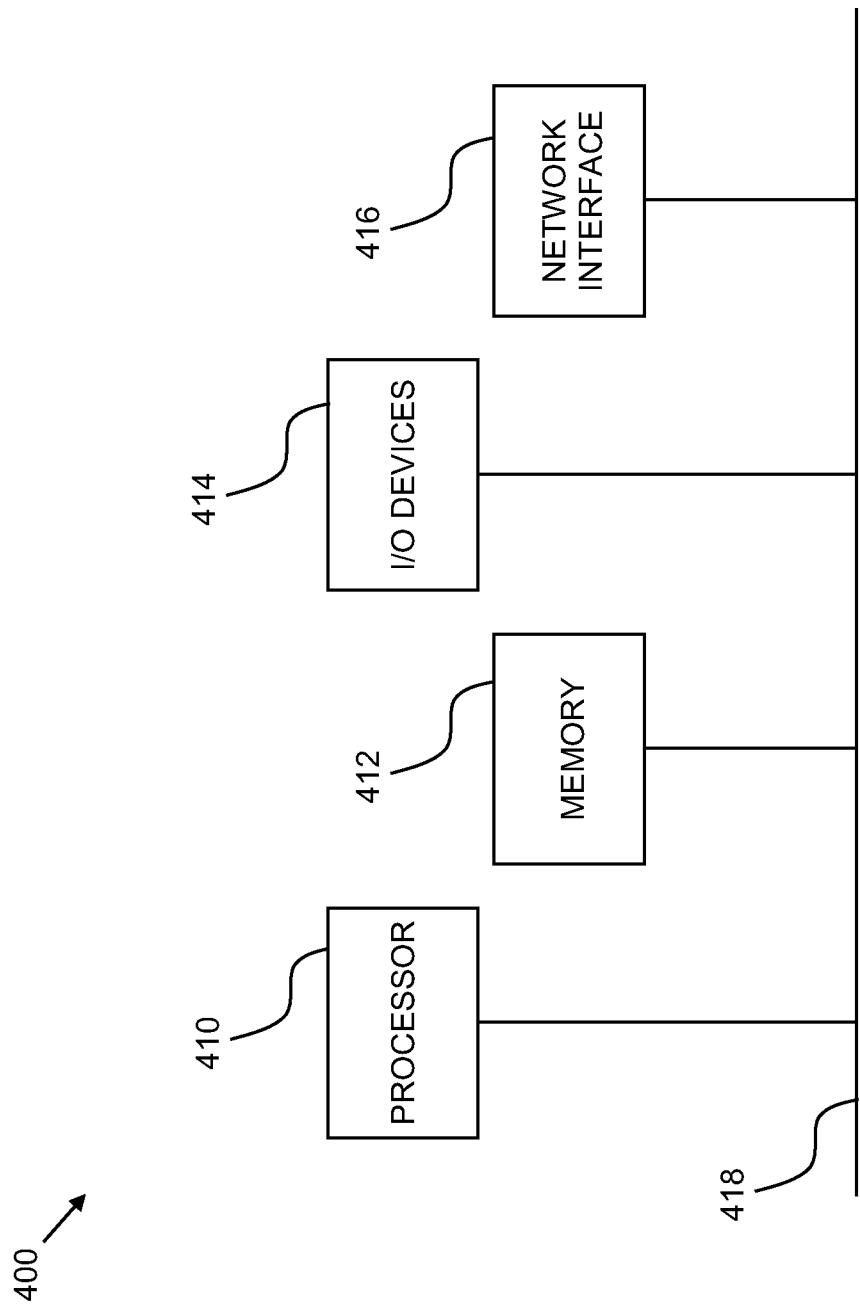

AUTOMATED DOCUMENT REDACTION

FIELD OF THE INVENTION

The invention relates to computer data access control and privacy in general.

BACKGROUND OF THE INVENTION

Many organizations maintain documents that include information, such as of a medical or financial nature, that is deemed sensitive and whose exposure to individuals is restricted by company policy, or even by law. Such organizations may employ document redaction software that removes sensitive information from documents before they are shown to individuals requesting access to such documents. Document redaction software typically removes sensitive information from documents automatically according to a set of predefined rules, such as where a rule dictates that a number that appears to be a credit card number be redacted from a document before it is provided to a recipient. Such rules may be further adapted based on the role of the recipient, such where a rule dictates that a credit card number be left in a document that is provided to an accounts receivable clerk and redacted from the document before the document is provided to recipients in other roles.

SUMMARY OF THE INVENTION

In one aspect of the invention a document redaction method is provided where the method includes identifying within a computer-based document stored on a non-transitory computer-readable medium, a candidate redaction element that is of a predefined redaction element type, identifying an evaluation element that is of a predefined evaluation element type and that is associated with the candidate redaction element, identifying a predefined logic expression that is associated with the redaction element type and that operates on the evaluation element type, evaluating the logic expression, thereby resulting in a value, identifying a predefined permission expression that is associated with the logic expression, that operates on the value, and that is associated with a recipient role, evaluating the permission expression, thereby identifying a redaction directive, and applying the redaction directive to the candidate redaction element within the computer-based document prior to the computer-based document being provided to a recipient having the recipient role.

Systems and computer-program products embodying the invention are also provided.

The term "document" as used herein refers to any data file that may be stored on a computer-readable data storage device, such as word processing files, database files, image files, audio files, etc.

BRIEF DESCRIPTION OF THE DRAWINGS

The invention will be understood and appreciated more fully from the following detailed description taken in conjunction with the appended drawings in which:

FIGS. 3A and 3B show exemplary pseudocode illustrating the system of FIG. 1 and method of FIG. 2; and FIG. 4 is a simplified block diagram illustration of an exemplary hardware implementation of a computing system, constructed and operative in accordance with an embodiment of the invention.

DETAILED DESCRIPTION OF THE INVENTION

Figure 1:
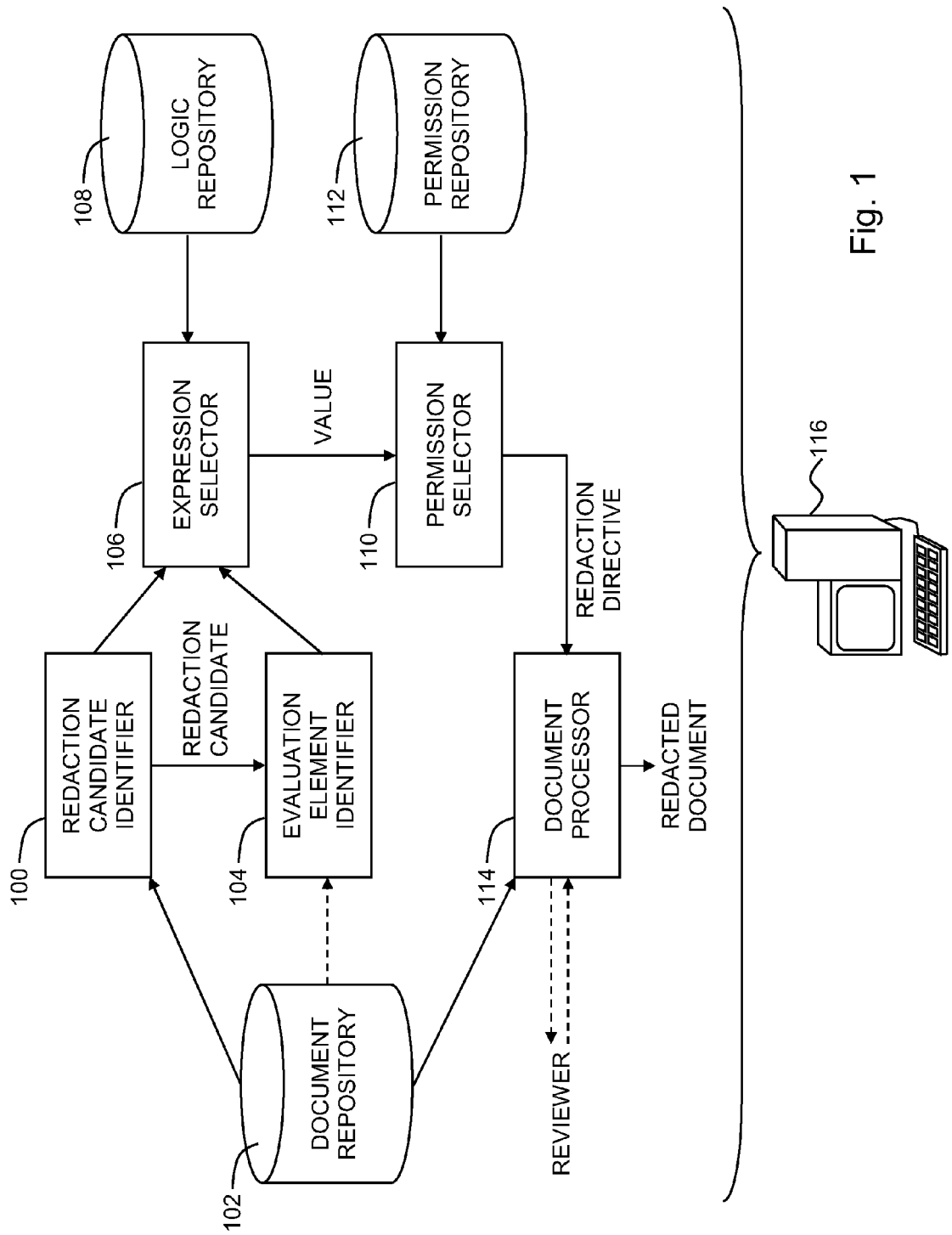
FIG. 1 is a simplified conceptual illustration of a document redaction system, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a document redaction system, constructed and operative in accordance with an embodiment of the invention. In the system of FIG. 1, a redaction candidate identifier 100 is configured to process computer-readable documents, such as may reside in a document repository 102 stored on a computer-readable data storage device, to identify one or more elements with a document, such as words or numbers, in accordance with conventional techniques. For example, identifier 100 may identify textual elements in accordance with predefined textual extraction rules using information-extraction software for unstructured text, such as System T™. Alternatively, identifier 100 may find text at a given Cartesian coordinate in a form-based document using OCR software like OmniPage as implemented in IBM InfoSphere Guardium Data Redaction™, the latter commercially available from International Business Machines Corporation, Armonk, N.Y. Redaction candidate identifier 100 is also preferably configured to determine, in accordance with conventional techniques, whether an element identified within a document is of a predefined redaction element type, and therefore a candidate for redaction. For example, redaction candidate identifier 100 may be configured to identify the character string "Bob Smith" as a redaction candidate within a document, and determine that the character string is the name of a person by virtue of being in a predefined list of common names.

An evaluation element identifier 104 is configured to identify one or more evaluation elements that are associated with the candidate redaction element identified by redaction candidate identifier 100, where an evaluation element is of a predefined evaluation element type. Continuing with the previous example, evaluation element identifier 104 may be configured to identify a date that is associated with "Bob Smith," such as his birth date, as an evaluation element. Evaluation element identifier 104 may identify evaluation elements within the same computer-readable document where a candidate redaction element is found. Additionally or alternatively, evaluation element identifier 104 may identify evaluation elements from other sources. For example, evaluation element identifier 104 may lookup Bob Smith's birth date from a database responsive to redaction candidate identifier 100 finding the name "Bob Smith" in a computer-readable document. Or evaluation element identifier 104 may lookup Bob Smith's birth date from the database responsive to finding another element associated with Bob Smith, such as a Social Security Number for Bob Smith, on the same computer-readable document where redaction candidate identifier 100 found "Bob Smith." That is, for example, in one embodiment evaluation element identifier 104 associates a social security number to an adjacent (or at least proximate) personal name in a free text document. In another embodiment, there may be an external mapping (e.g., in a database between names and social security numbers, so that evaluation elements identifier 104 retrieves, for a name in a document, a social security number associated with the name according to that map.

An expression selector 106 is configured to identify one or more predefined logic expressions that are associated with redaction elements of the type identified by redaction candidate identifier 100 and that operate on evaluation elements of the type identified by evaluation element identifier 104. The predefined logic expressions may reside in a logic repository 108 stored on a computer-readable data storage device, and may include Boolean logic or other known logic. Continuing with the previous example, a logic expression may have been derived from a company policy or legal regulation that dictates that the name of an individual may or may not require redaction from a computer-based document based at least partly on the individual's age. As such, the logic expression is associated with redaction elements that are names and operates on dates that are birth dates. Expression selector 106 may thus identify the logic expression based on the candidate redaction element "Bob Smith" and his identified birth date as the evaluation element. Expression selector 106 is also preferably configured to evaluate the identified logic expression, where the evaluation results in (i.e., generates) one or more values. For example, where the logic expression defines a criteria concerning whether the age identified by evaluation element identifier 104 of the individual "Bob Smith" identified by candidate identifier 100 is less than 18 years old, the value generated by expression selector 106 may be "true" or "false." In another example, where candidate identifier 100 indicates that a candidate redaction element type is a person's name and an associated logic expression indicates that the person has a birth date identified by evaluation element identifier 104, the value generated by expression selector 106 may be a name in the computer readable document of a person having that birth date, e.g., "Bob Smith." In this case, expression selector 106 generates the specific candidate redaction element itself.

A permission selector 110 is configured to identify one or more predefined permission expressions responsive to a recipient role and the value resulting from the expression selector 106 evaluation of the logic expression. The predefined permission expressions may reside in a permission repository 112 stored on a computer-readable data storage device. Continuing with the previous example, permission selector 110 may be configured to identify a permission expression that is associated with the logic expression identified by expression selector 106, that operates on the value resulting from the evaluation of the logic expression, and that is associated with the recipient role "visiting nurse." Permission selector 110 is also preferably configured to evaluate the permission expression, where the evaluation results in a redaction directive that determines whether or not the candidate redaction element is redacted from the computer-readable document. For example, the redaction directive may indicate that the candidate redaction element is to be allowed to remain unaltered within the document where the document recipient is a visiting nurse and the individual is 18 years old or older, or may indicate that the candidate redaction element is to be redacted from the document in accordance with conventional techniques where the individual is less than 18 years old.

A document processor 114 is configured to apply the redaction directive identified by permission selector 110 to the candidate redaction element within the computer-based document, whereupon the computer-based document may be provided to a recipient having the recipient role, such as to a visiting nurse as in the previous example. Document processor 114 may be configured to provide a redaction profile for human review, where the redaction profile for a candidate redaction element includes information regarding any of the elements, types, logic expressions, permission expressions, evaluation result values, redaction directives, roles, and recipients described hereinabove, enabling the reviewer to approve or disapprove of the application of the redaction directive to the computer-based document.

Any of the elements shown in FIG. 1 are preferably executed by, or are otherwise accessible to, a computer 116, such as by implementing any of the elements in computer hardware and/or in computer software embodied in a physically-tangible, computer-readable storage medium in accordance with conventional techniques.

Figure 2:
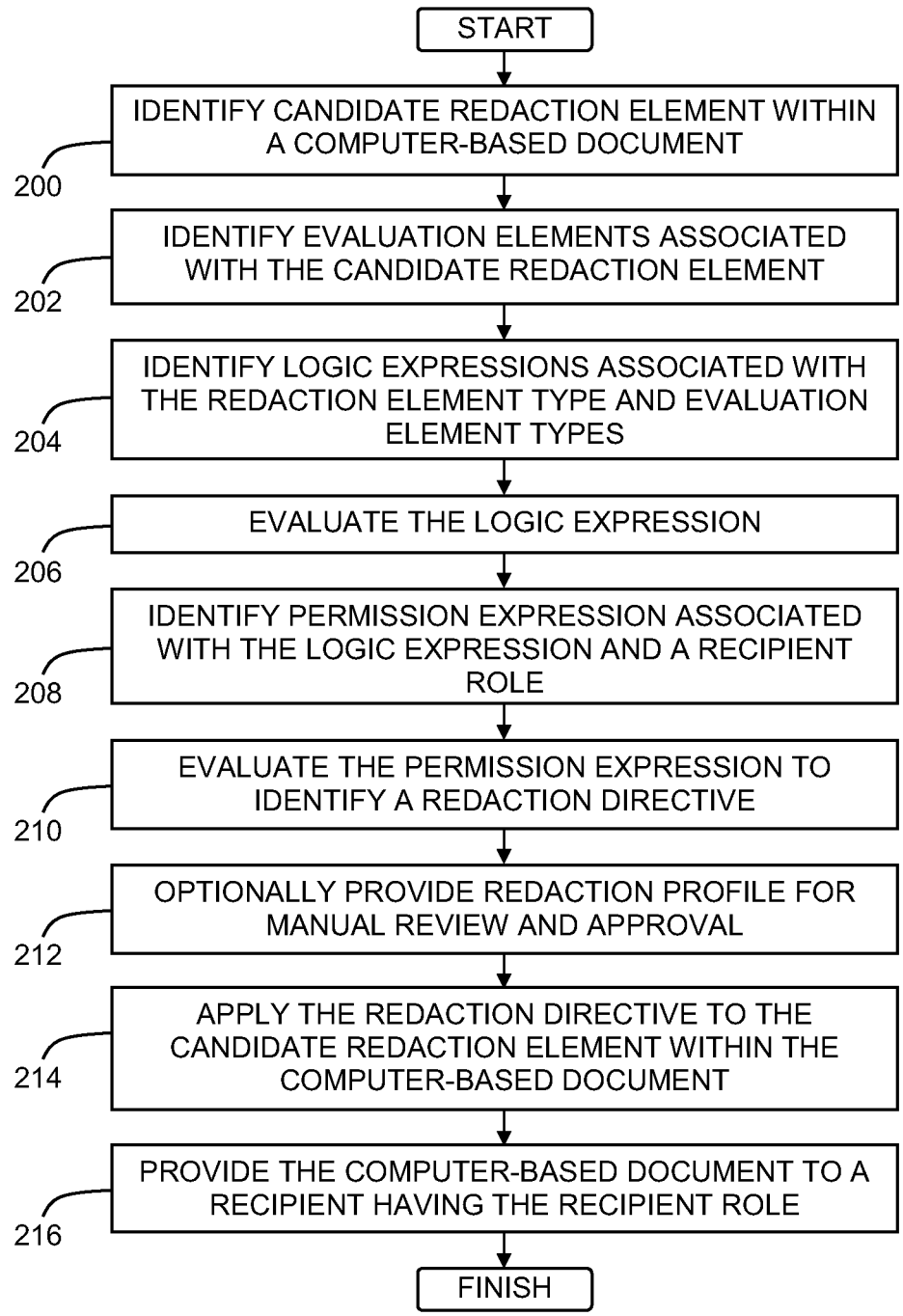
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2, a candidate redaction element is identified within a computer-based document, where the candidate redaction element is of a predefined redaction element type (step 200). One or more evaluation elements associated with the candidate redaction element are identified, where each evaluation element is of a predefined evaluation element type (step 202). One or more predefined logic expressions are identified, where each logic expression is associated with the redaction element type and operates on one or more of the identified evaluation element types (step 204). The logic expression is evaluated, resulting in a value (step 206). A predefined permission expression is identified that is associated with the logic expression, that operates on the value, and that is associated with a recipient role (step 208). The permission expression is evaluated to identify a redaction directive (step 210). A redaction profile for the candidate redaction element is optionally provided for human review and approval or disapproval of the redaction directive (step 212). The redaction directive is applied to the candidate redaction element within the computer-based document (step 214), whereupon the computer-based document may be provided to a recipient having the recipient role (step 216).

The system of FIG. 1 and method of FIG. 2 may be illustrated with reference to exemplary pseudocode as shown in FIGS. 3A and 3B as follows. FIG. 3A shows a pseudocode logic expression labeled "E" which relates to a candidate redaction element labeled "p" of candidate redaction element type "PersonName" and operates on an evaluation element labeled "d" of evaluation element type "DateOfBirth" that have been identified in a computer-based document. Expression "E" returns the object "p" if and only if the DateOfBirth "d" is less than 18 years in the past, and returns a value of false otherwise. Where "p" is returned from Expression "E", the permission expression shown in FIG. 3B is identified as relating to Expression "E" for the recipient role "Visiting Nurse". The evaluation of the permission expression shown in FIG. 3B given the result of the evaluation of Expression "E" results in a redaction directive that states that "p" is to be redacted as Expression "E" is satisfied.

Referring now to FIG. 4, block diagram 400 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A document redaction method comprising:
   identifying within a computer-based document stored on a computer-readable storage medium, a candidate redaction element that is of a predefined redaction element type;
   identifying an evaluation element within the document of a predefined evaluation element type and that associated with the candidate redaction element, wherein the evaluation element of the candidate redaction element associates one evaluation element type of information with the candidate redaction element;
   identifying a predefined logic expression that is associated with the redaction element type and that operates on the evaluation element of the evaluation element type;
   evaluating the identified predefined logic expression by a processor, wherein the evaluating includes generating a value for the predefined logic expression;
   identifying, for the predefined logic expression, a predefined permission expression that is associated with the predefined logic expression that operates on the value and that is associated with a recipient role;
   evaluating the permission expression, wherein evaluating the permission expression includes identifying a redaction directive; and
   applying the redaction directive to the candidate redaction element within the computer-based document prior to the computer-based document being provided to a recipient having the recipient role.

2. The method of claim 1 where the applying step comprises redacting the identified element from the computer-based document prior to the computer-based document being provided to the recipient.

3. The method of claim 1 where the applying step comprises providing the identified element within the computer-based document when the computer-based document is provided to the recipient.

4. The method of claim 1 wherein the candidate redaction element includes a textual element and identifying the candidate redaction element comprises identifying the candidate redaction element within the computer-based document in accordance with a predefined textual extraction rule.

5. The method of claim 1 where the identifying the predefined logic expression comprises identifying a predefined logic expression that includes Boolean logic.

6. The method of claim 1 where the identifying the predefined logic expression comprises identifying a predefined logic expression derived from any of company policy and a legal regulation.

7. The method of claim 1 where the evaluating the predefined logic expression comprises generating any of a "true" value, a "false" value, and the candidate redaction element.

8. The method of claim 1 and further comprising:
   providing a redaction profile for human review, where the redaction profile includes information regarding any of the candidate redaction element, redaction element type, evaluation elements, evaluation element types, at least one logic expression, values, permission expression, recipient role, redaction directive, and recipient; and
   receiving any of approval and disapproval of the application of the redaction directive to the computer-based document.

9. A computer system comprising:
   a processor; and
   a computer-readable storage medium operatively coupled to the processor, wherein the storage medium has stored thereon a document redaction program for controlling the processor, and wherein the processor is operative with the program to provide:
      a redaction candidate identifier configured to identify within a computer-based document stored on a computer-readable storage medium, a candidate redaction element of a predefined redaction element type;
      an evaluation element identifier configured to identify an evaluation element within the document of a predefined evaluation element type and associated with the candidate redaction element, wherein the evaluation element of the candidate redaction element associates one evaluation element type of information with the candidate redaction element;
      an expression selector configured to
         identify a predefined logic expression that is associated with the redaction element type and that operates on the evaluation element of the evaluation element type, and
         evaluate the identified predefined logic expression, wherein the evaluating includes generating a value for the predefined logical expression;
      a permission selector configured to
         identify, for the predefined logic expression, a predefined permission expression that is associated with the predefined logic expression, that operates on the value and that is associated with a recipient role, and
         evaluate the permission expression, wherein evaluating the permission expression includes identifying a redaction directive; and
      a document processor configured to apply the redaction directive to the candidate redaction element within the computer-based document prior to the computer-based document being provided to a recipient having the recipient role.

10. The system of claim 9 where the document processor is configured to redact the identified element from the computer-based document prior to the computer-based document being provided to the recipient.

11. The system of claim 9 where the document processor is configured to provide the identified element within the computer-based document when the computer-based document is provided to the recipient.

12. The system of claim 9 where the candidate redaction element includes a textual element and the redaction candidate identifier configured to identify a candidate redaction element of a predefined redaction element type is further configured to identify the candidate redaction element within the computer-based document in accordance with a predefined textual extraction rule.

13. The system of claim 9 where the predefined logic expression includes Boolean logic.

14. The system of claim 9 where the predefined logic expression is derived from any of company policy and a legal regulation.

15. The system of claim 9 where the expression selector configured to evaluate the predefined logic expressions to generate any of a "true" value, a "false" value, and the candidate redaction element.

16. The system of claim 9 where the document processor is configured to
provide a redaction profile for human review, where the redaction profile includes information regarding any of the candidate redaction element, redaction element type, evaluation elements, evaluation element types, at least one logic expression, values, permission expression, recipient role, redaction directive, and recipient, and
receive any of approval and disapproval of the application of the redaction directive to the computer-based document.

17. The system of claim 9, where the redaction candidate identifier, evaluation element identifier, expression selector, permission selector, and document processor are embodied in any of
a) computer hardware, and
b) computer software embodied in a computer-readable storage medium.

18. A computer program product for document redaction, the computer program product comprising:
a computer-readable storage medium; and
computer-readable program code embodied in the computer-readable storage medium, where the computer-readable program code is configured to cause a computer system to implement a method comprising:
identifying within a computer-based document stored on a computer-readable storage medium, a candidate redaction element that is of a predefined redaction element type;
identifying an evaluation element in the document of a predefined evaluation element type and associated with the candidate redaction element, wherein the evaluation element of the candidate redaction element associates one evaluation element type of information with the candidate redaction element;
identifying a predefined logic expression that is associated with the redaction element type and that operates on the evaluation elements of the evaluation element type;
evaluating the identified predefined logic expression, wherein the evaluating includes generating a value for the predefined logic expression;
identifying, for the predefined logic expressions, a predefined permission expression that is associated with the predefined logic expression, that operates on the value and that is associated with a recipient role;
evaluating the permission expression, wherein evaluating the permission expression includes identifying a redaction directive; and
applying the redaction directive to the candidate redaction element within the computer-based document prior to the computer-based document being provided to a recipient having the recipient role.

19. The computer program product of claim 18 where the computer-readable program code is configured to cause the computer system to redact the identified element from the computer-based document prior to the computer-based document being provided to the recipient.

20. The computer program product of claim 18 where the computer-readable program code is configured to cause the computer system to provide the identified element within the computer-based document when the computer-based document is provided to the recipient.

21. The computer program product of claim 18 wherein the candidate redaction element includes a textual element and wherein the computer-readable program code configured to identify the candidate redaction element is further configured to identify the candidate redaction element within the computer-based document in accordance with a predefined textual extraction rule.

* * * * *